United States Patent
Imai et al.

(10) Patent No.: US 7,339,649 B2
(45) Date of Patent: Mar. 4, 2008

(54) LENS BARREL AND IMAGING DEVICE

(75) Inventors: Satoshi Imai, Kanagawa (JP);
Masayasu Mizushima, Gifu (JP); Shuji Shimizu, Kanagawa (JP); Yutaka Sato, Tokyo (JP); Hiroyuki Tabei, Kanagawa (JP)

(73) Assignee: Sony Corporation (JP)

( * ) Notice: Subject to any disclaimer, the term of this patent is extended or adjusted under 35 U.S.C. 154(b) by 552 days.

(21) Appl. No.: 11/004,883

(22) Filed: Dec. 7, 2004

(65) Prior Publication Data

US 2005/0134776 A1 Jun. 23, 2005

(30) Foreign Application Priority Data

Dec. 17, 2003 (JP) .......................... P2003-419370

(51) Int. Cl.
*G02F 1/13* (2006.01)
*G02F 1/1337* (2006.01)
*G03B 9/02* (2006.01)

(52) U.S. Cl. ...................... 349/200; 349/123; 348/340; 396/506

(58) Field of Classification Search ................ 349/335, 349/340, 207.99, 352–367, 123, 200; 396/249, 396/262, 457, 506; 348/335, 340, 207.99, 348/352–367

See application file for complete search history.

(56) References Cited

U.S. PATENT DOCUMENTS 4,969,719 A * 11/1990 Bradshaw et al. .......... 349/116
6,842,211 B2 * 1/2005 Katsura ....................... 349/123
6,870,567 B2 * 3/2005 Funston et al. ......... 348/333.04
7,186,039 B2 * 3/2007 Mihara ....................... 396/457

FOREIGN PATENT DOCUMENTS

| JP | 60-241031 A | 11/1985 |
| JP | 63-142962 U | 9/1988 |
| JP | 05-048060 A | 2/1993 |
| JP | A 2002-082358 | 3/2002 |

OTHER PUBLICATIONS

JPO Office Action dated Jun. 14, 2006.

* cited by examiner

*Primary Examiner*—Toan Ton
*Assistant Examiner*—John Heyman
(74) *Attorney, Agent, or Firm*—Rader Fishman & Grauer PLLC; Ronald P. Kananen

(57) ABSTRACT

A lens barrel and imaging device advantageous for making unnatural brightness variation in an image, due to a liquid-crystal light control element, less noticeable, while reducing the size of an optical system, are disclosed. A lens barrel comprises an optical system, a rectangular planar liquid-crystal light control element, and an imaging element. An object image captured by the optical system is guided to the imaging element through the control element comprising a liquid crystal layer sealed in between a pair of alignment layers and containing rod-shaped liquid crystal molecules. A sensor unit of the imaging element has a rectangular imaging area. Light rays guided from the optical system to the imaging element diverge away from an optical axis. An orientational direction of the control element is substantially parallel to the shorter sides of the imaging area.

15 Claims, 17 Drawing Sheets

F I G. 7
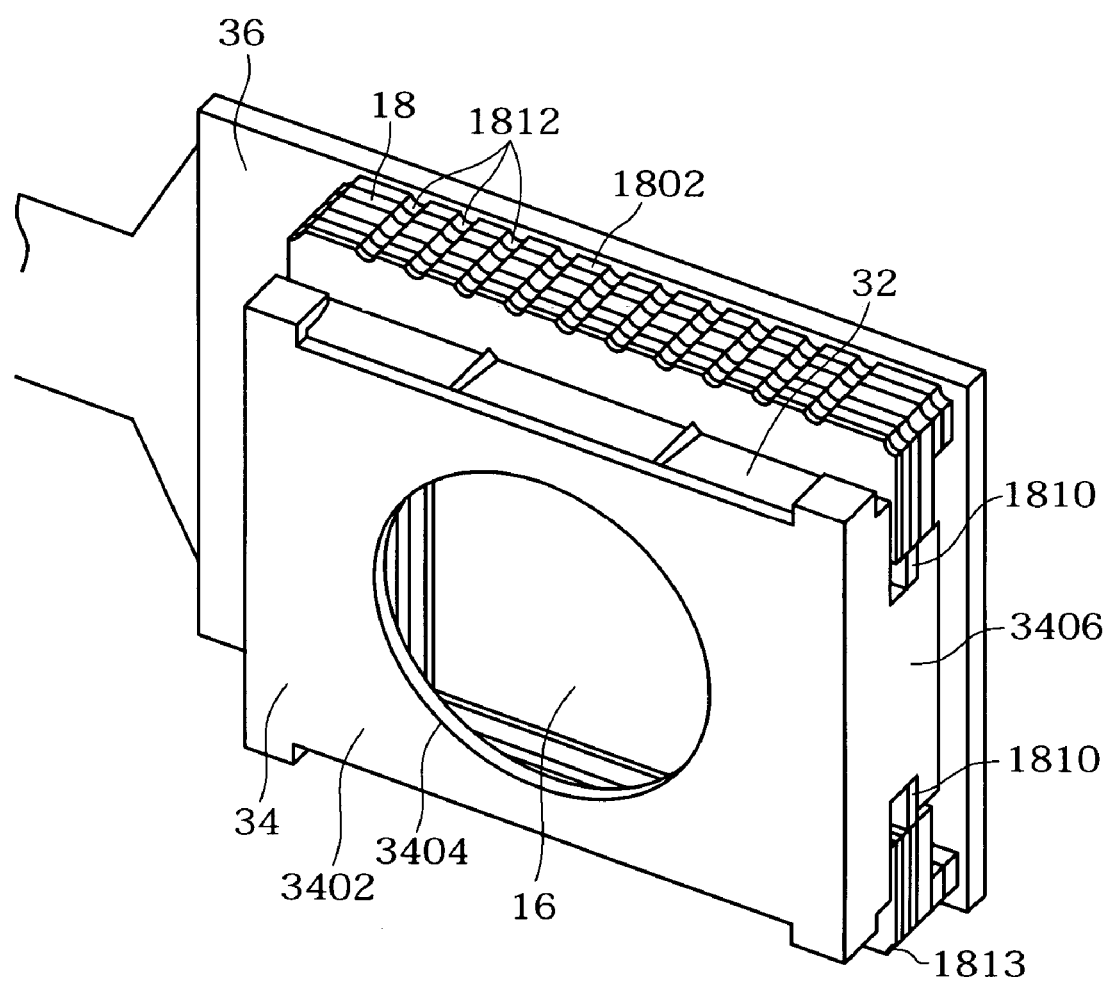

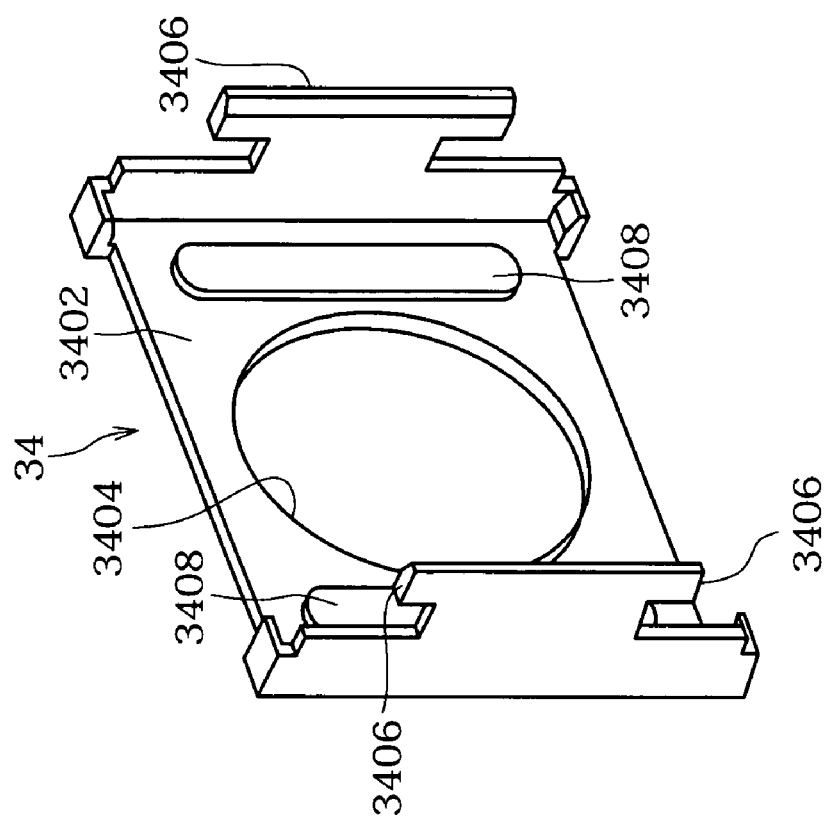
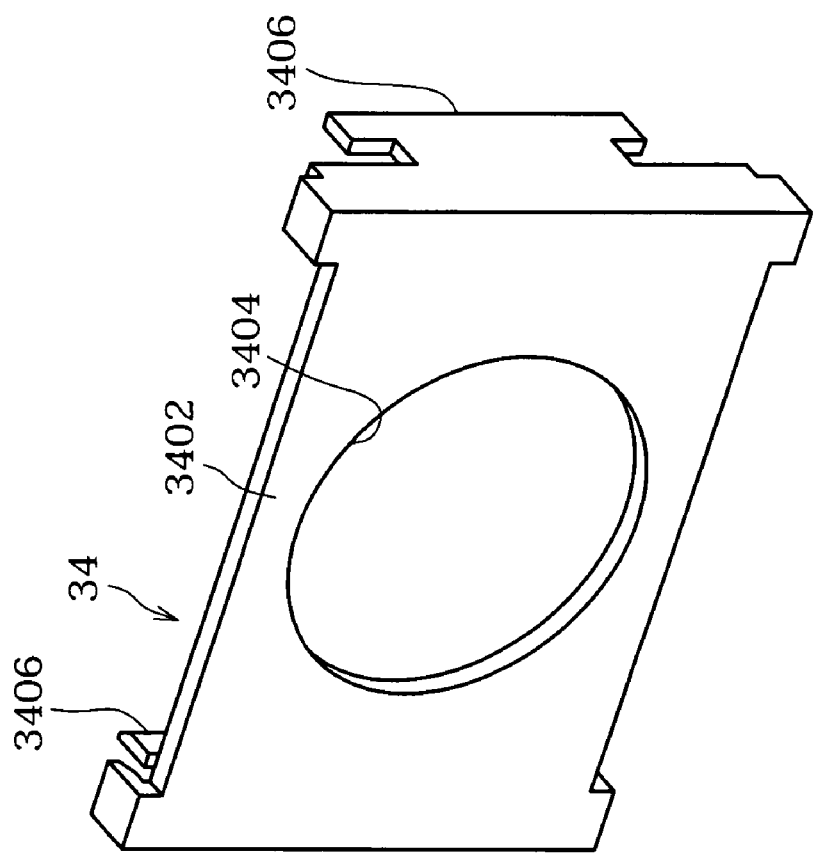

DIRECTION OF ORIENTATION

DIRECTION OF ORIENTATION

LENS BARREL AND IMAGING DEVICE

BACKGROUND OF THE INVENTION

1. Field of the Invention

The present invention relates to a lens barrel and an imaging device.

2. Description of Related Art

A lens barrel of an imaging device, such as a digital camera and video camera, comprises an optical system guiding an image of an object, an imaging element disposed in an optical axis of the optical system, which may be a CCD, and light control means for adjusting an amount of light guided to the imaging element along the axis of the optical system.

In many cases, an iris, which mechanically adjusts an aperture, is used as the light controlling means. However, use of the iris is disadvantageous for a reduction in size of the lens barrel since blades of the iris and a mechanism for driving the iris blades occupy a considerable space.

Therefore, there has been proposed an imaging device using a liquid-crystal light control element which occupies a relatively small space. For instance, such an imaging device is disclosed in JP-A-2002-82358.

As shown in FIG. 3, a liquid-crystal light control element 16 comprises a liquid crystal layer 1604 where a large number of liquid crystal molecules 1602, each rod-shaped, are sealed in such that the molecules 1602 are capable of being tilted together with longitudinal directions or axes of the respective molecules 1602 parallel to one another. By application of a voltage to the liquid-crystal light control element 16, the direction of the axes of the rod-shaped liquid crystal molecules 1602 that are parallel to one another is varied, changing an angle of the axes of the liquid crystal molecules 1602 with respect to the direction of the thickness of the liquid crystal layer 1604.

The smaller an angle made between the axes of the liquid crystal molecules 1602 and the direction of the light path is, the more light is allowed to pass through the light control element 16 (or, the higher the light transmission is). That is, the closer to a right angle the angle made between the axes and the direction of the light path is, the less light is allowed to pass through the light control element 16 (or, the lower the light transmission is).

An optical system 14 of the imaging device comprises a plurality of lenses 1402, 1404 and a cylindrical body 1406 holding the lenses 1402, 1404. In terms of optical design, it is often the case that when the diameters of the lenses 1402, 1404 and the dimensions of the lenses 1402, 1404 in the direction of an optical axis of the optical system 14 are reduced to decrease the outer diameter and length of the cylindrical body 1406 in order to reduce the size of the optical system 14, rays of light guided from the cylindrical body 1406 to an imaging element 18 respectively diverge away from the optical axis of the lenses 1402, 1404 as they travel toward the imaging element 18.

Therefore, to reduce the diameter and length of the cylindrical body 1406 of the lens barrel 10 and dispose a liquid-crystal light control element 16 as light controlling means between the cylindrical body 1406 and the imaging element 18 is significantly advantageous for a reduction in size of the lens barrel 10, but this invites the drawback that light rays passing through the liquid-crystal light control element 16 are not parallel to one another, but respectively diverge away from the optical axis of the lenses 1402, 1404.

Accordingly, when the light rays diverging away from the optical axis of the lenses pass through the liquid-crystal light control element 16, with the liquid crystal molecules 1602 inclined to make an angle with respect to the direction of the thickness of the liquid crystal layer 1604, as shown in FIG. 14, the angle formed between the transmitted light, that is, light passing through the liquid-crystal light control element 16, and the axes of the liquid crystal molecules 1602 is not uniform over a plane of the liquid crystal layer 1604, but varies in a direction parallel to the plane. Therefore, the amount of passing light also varies depending on the location in the plane of the liquid crystal layer 1604.

When the amount of light passing through the light control element 16 thus varies in a direction along a plane of an imaging area 1802 of the imaging element 18 due to the reduction in size of the optical system 14, there is caused an inconvenience that an unnatural difference or variation in brightness occurs in an image taken by the imaging element 18.

SUMMARY OF THE INVENTION

The present invention has been developed in view of the above-described situations, and therefore its object is to provide a lens barrel and an imaging device which is advantageous for making the unnatural variation in brightness in an image due to the liquid-crystal light control element less noticeable when the image is viewed, while accomplishing a reduction in the size of the optical system.

To attain the object, one aspect of the present invention is directed to a lens barrel comprising an optical system having an optical axis and guiding an image of an object, an imaging element which includes a rectangular imaging area having longer sides and shorter sides, and that is disposed in the optical axis of the optical system, and a liquid-crystal light control element which is disposed in the optical axis between the optical system and the imaging element and comprises a pair of transparent electrodes which are disposed in parallel to each other with spacing therebetween in a direction along the optical axis; a pair of alignment layers formed on respective opposing surfaces of the transparent electrodes, and a liquid crystal layer which is sealed in between the alignment layers and contains liquid crystal molecules each rod-like shaped, the liquid-crystal light control element adjusting an amount of light passing therethrough by changing a tilt angle of axes of the liquid crystal molecules with respect to a direction of the thickness of the liquid crystal layer by application of a voltage to the transparent electrodes, with the axes of the respective liquid crystal molecules parallel to an orientational direction which is determined by the alignment layers, wherein the orientational direction is substantially parallel to the shorter sides of the imaging area.

Another aspect of the present invention is directed to an imaging device comprising an optical system having an optical axis and guiding an image of an object, an imaging element which includes a rectangular imaging area having longer sides and shorter sides, and is disposed in the optical axis of the optical system, and a liquid-crystal light control element which is disposed in the optical axis between the optical system and the imaging element and comprises a pair of transparent electrodes which are disposed in parallel to each other with spacing therebetween in a direction along the optical axis, a pair of alignment layers formed on respective opposing surfaces of the transparent electrodes, and a liquid crystal layer which is sealed in between the alignment layers and contains liquid crystal molecules, each rod-like shaped, the liquid-crystal light control element adjusting an amount of light passing therethrough by changing a tilt angle of axes of the liquid crystal molecules with respect to a direction of the thickness of the liquid crystal layer by application of a voltage to the transparent electrodes, with the axes of the respective liquid crystal molecules parallel to an orientational direction which is determined by the alignment layers, wherein the orientational direction is substantially parallel to the shorter sides of the imaging area.

According to the invention where the orientational direction of the liquid-crystal light control element is substantially parallel to the shorter sides of the imaging area, even when the amount of light passing through the liquid-crystal light control element varies depending on the location in the plane of the liquid-crystal light control element, with the angle of the light emitted from the optical system and passing through the liquid-crystal light control element with respect to the direction of the thickness of the liquid crystal layer of the liquid-crystal light control element being varied depending on the location in the plane due to the reduction in size of the optical system, the influence of the variation in the amount of the light passing through the liquid-crystal light control element on the brightness in the image is reduced compared to an arrangement where the orientational direction of the liquid-crystal light control element is substantially parallel to the longer sides of the imaging area, because the variation in the amount of the light passing through the liquid-crystal light control element is smaller than that in the compared arrangement. Thus, the invention is advantageous for making the unnatural variation in brightness in the taken image less noticeable when the image is viewed.

BRIEF DESCRIPTION OF THE DRAWINGS

FIG. 7 is an assembly diagram of a rear unit partially constituting the lens barrel including a liquid-crystal light control element and an imaging element;

FIGS. 10(A) and 10(B) are perspective views of a holding member included in the rear unit;

DETAILED DESCRIPTION OF THE PREFERRED EMBODIMENTS

The object of the invention that the unnatural variation in brightness in an image due to the liquid-crystal light control element is to be made less noticeable when the image is viewed while reducing the size of the optical system, is attained by disposing a liquid-crystal light control element such that the orientational direction of the liquid-crystal light control element is substantially parallel to the shorter sides of an imaging area of an imaging element.

First Embodiment

There will be described a first embodiment of the invention with reference to the drawings.

In the first embodiment, a lens barrel according to the invention is built into an imaging device.

Figure 1:
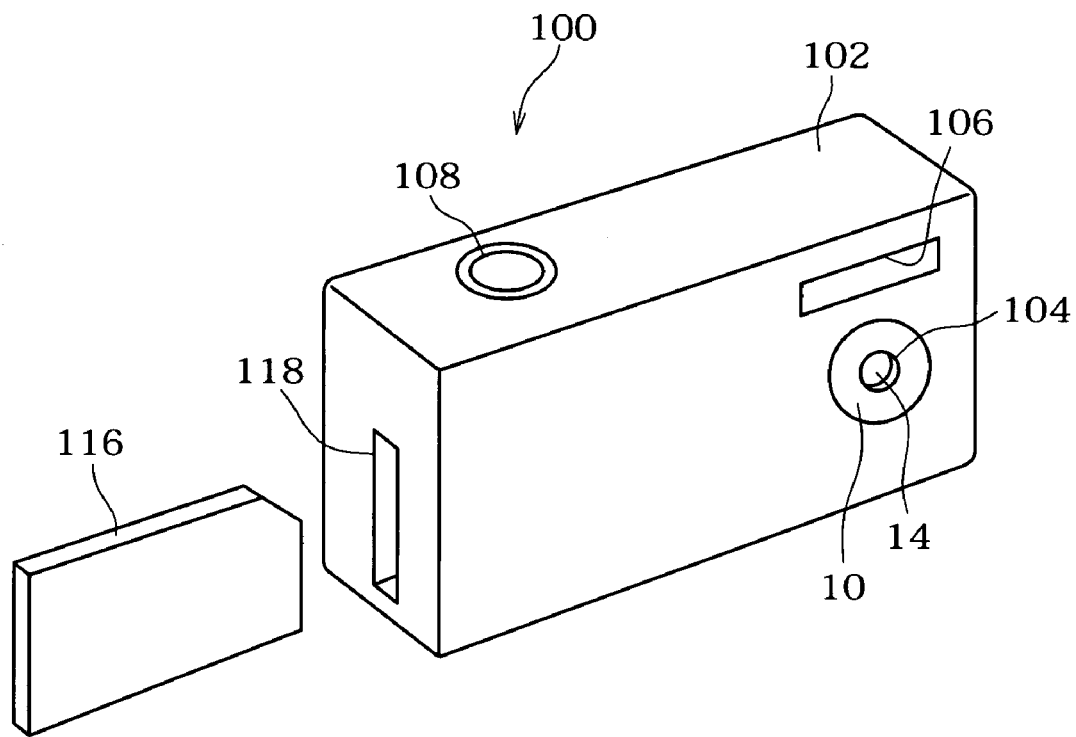
FIG. 1 is a perspective view of an imaging device according to a first embodiment of the invention, as seen from its front side.
Figure 2:
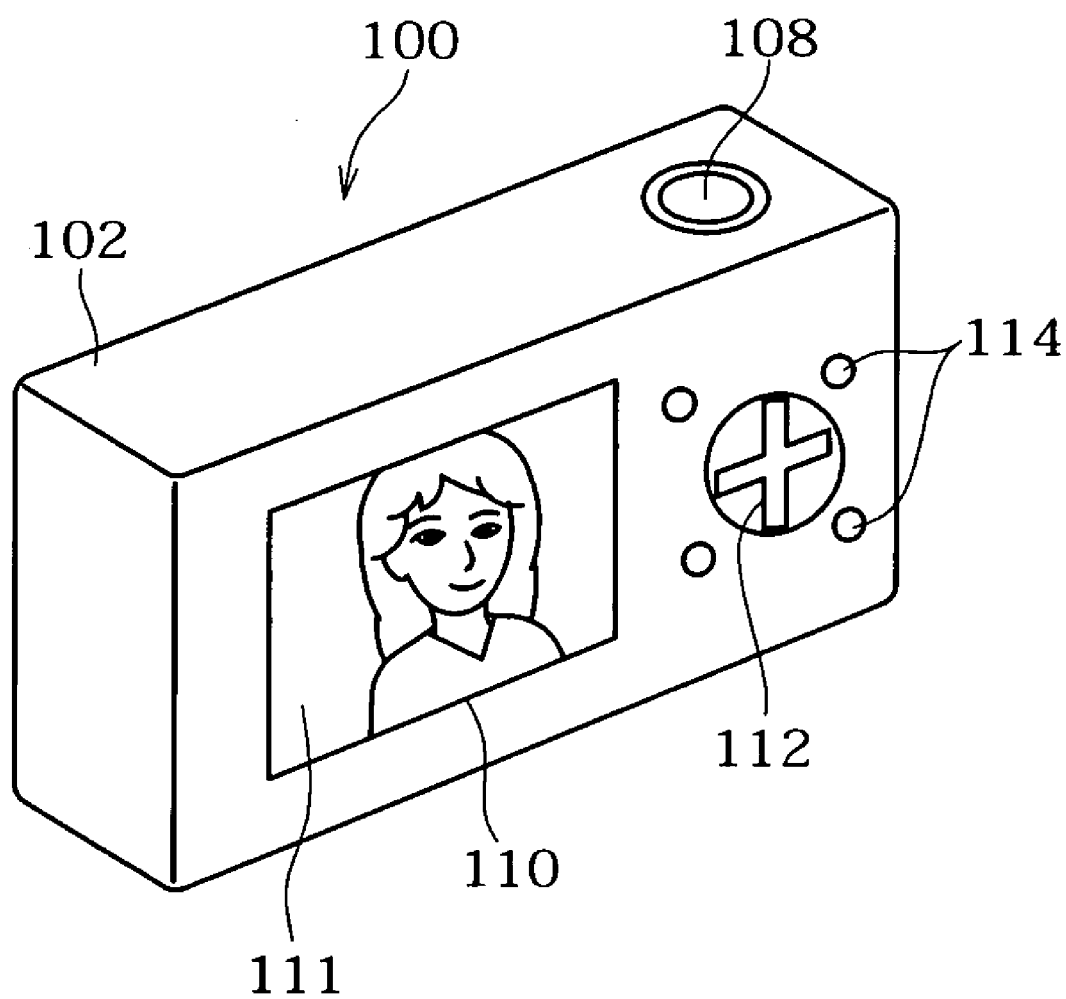
FIG. 2 is a perspective view of the imaging device of the first embodiment, as seen from its back side.

As shown in FIGS. 1 and 2, the imaging device 100 is a digital still camera comprising a casing 102 of a rectangular planar shape as a outer covering. In this specification, 'left' and 'right' are as seen from the front side of the imaging device 100, with the front and back sides being the side of an object whose image is to be taken and the side of an imaging element, respectively, with respect to an optical axis of an optical system 14.

The lens barrel 10 according to the invention is built into the right-hand side of the casing 102.

Figure 3:
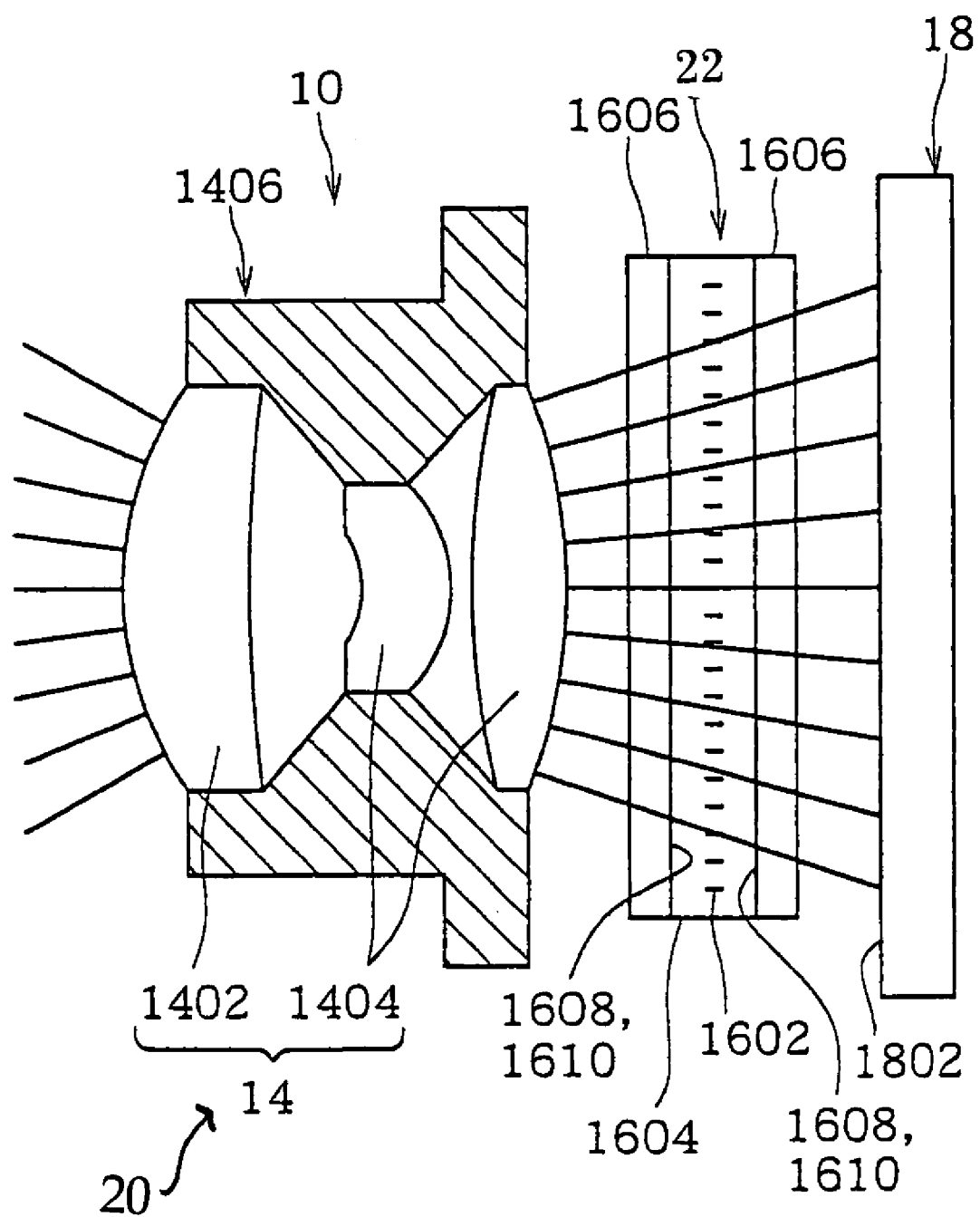
FIG. 3 is a schematic view of a lens barrel shown in FIG
Figure 5:
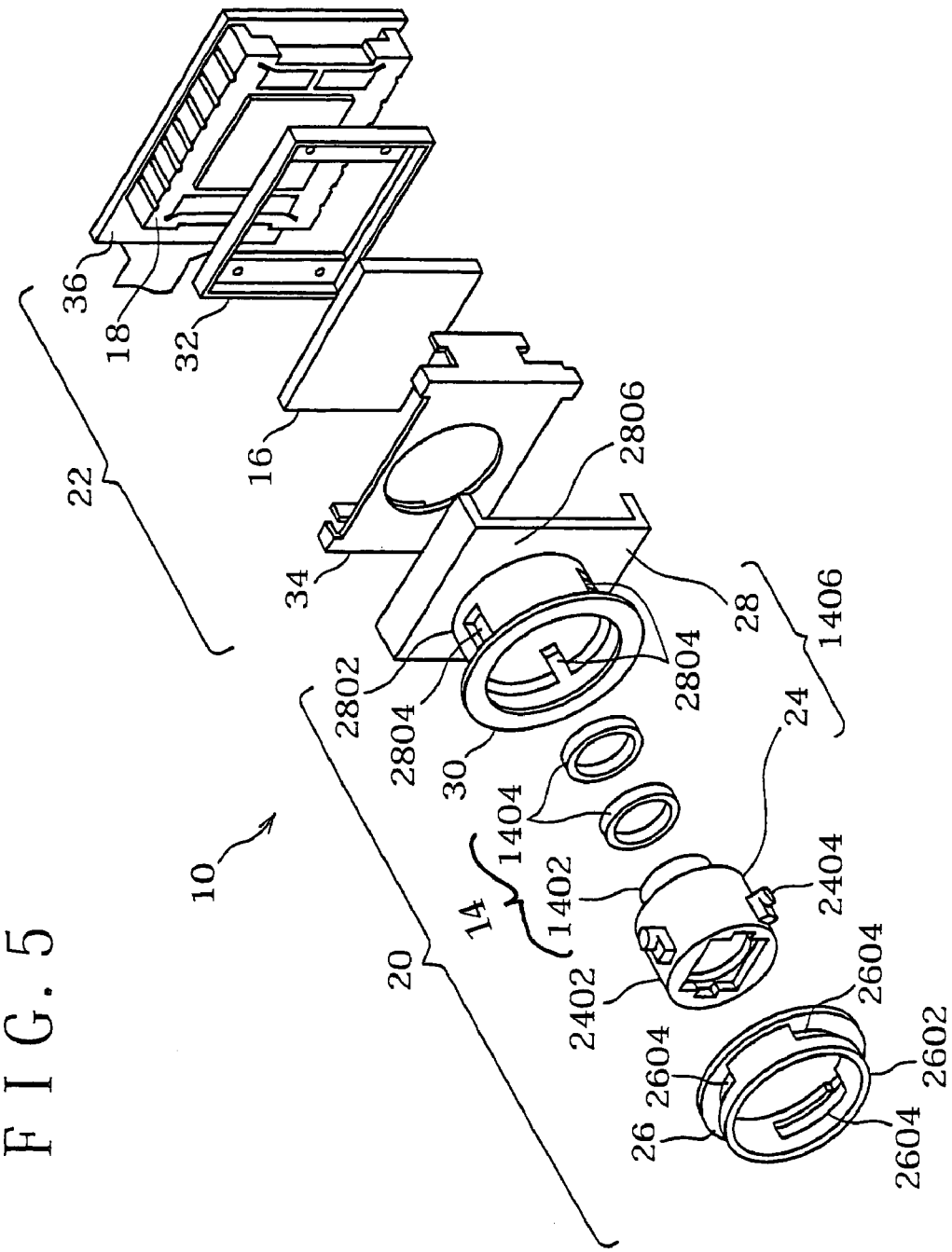
FIG. 5 is an exploded perspective view of the lens barrel.

As shown in FIGS. 3 and 5, the lens barrel 10 comprises a front unit 20 including the optical system 14 and a cylindrical body 1406 and a rear unit 22 including a liquid-crystal (LC) light control element 16 and an imaging element 18.

The image of the object captured by the optical system 14 is transmitted through the LC light control element 16 and guided to the imaging element 18.

The optical system 14 comprises a front lens group 1402 and a rear lens group 1404 which are held by and inside the cylindrical body 1406.

The front lens group 1402 is disposed to be exposed to an external space on the front side of the casing 102 via a lens window 104 formed in a front face of the casing 102.

As shown in FIG. 1, above the lens window 104 is disposed a strobe light unit 106 which emits a flash of light for aiding shooting in an environment with a low light level.

In a left-hand part of an upper face of the casing 102, there is disposed a shutter button 108, for instance.

As shown in FIG. 2, the back face of the casing 102, there are disposed a liquid crystal display 110, where an image, such as a still image and a dynamic image and characters and symbols are presented on the screen, an arrow switch 112 for inputting instructions therethrough to carry out various operations, and a plurality of manipulation buttons 114.

In the present embodiment, the display 110 has a screen 111 of a rectangular shape whose longer sides extend in the horizontal direction and shorter sides in the vertical direction. In ordinary use, the shorter sides of the screen 111 are parallel to the vertical direction of the imaging device 100 and the longer sides are parallel to the lateral direction of the imaging device 100, a shown in FIG. 2.

In a left face of the casing 102 is disposed a memory loading slot 118 in which a memory card 116 or a storage medium for recording an image, such as a still image and a dynamic image, is removably inserted.

An image taken by the imaging element 18 is outputted in the form of an image signal to an image processor 120 which generates image data of a still or dynamic image based on the image signal. The image data are recorded to the memory card 116. The image data are also presented on the display 110 by a display processor 122. The imaging device 100 further comprises a controller 124 including a CPU controlling the image and display processors 120, 122 in response to manipulation of a shutter button 116, an arrow switch 112 and manipulation buttons 114.

Figure 6:
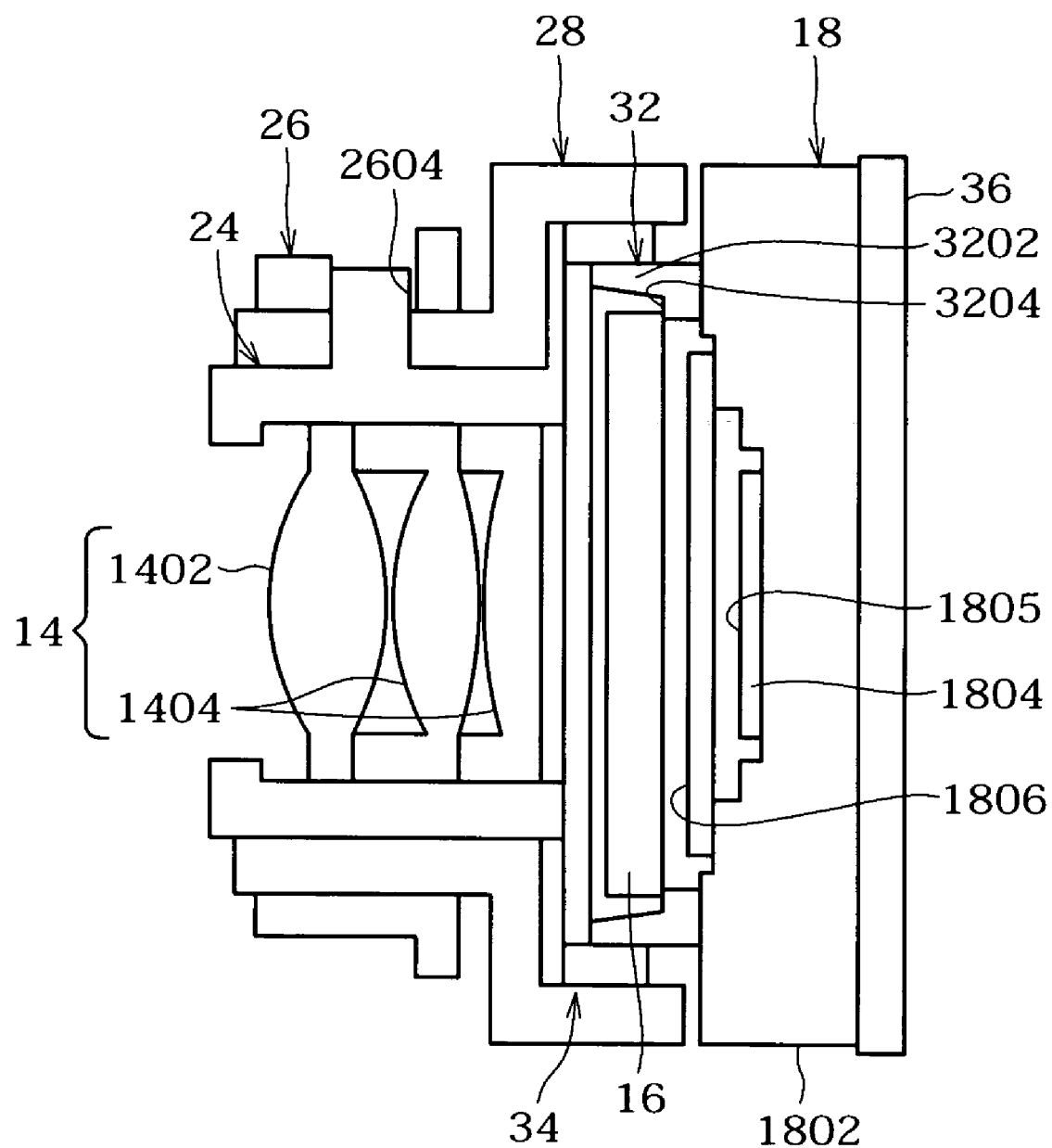
FIG. 6 is a cross-sectional view of the lens barrel.

As shown in FIGS. 5 and 6, the front unit 20 comprises a holder 24, a movable ring 26, a main part 28 of the cylindrical body 1406, and a spring washer 30. The cylindrical body 1406 in this embodiment is constituted by the holder 24 and a main part 28.

The holder 24 comprises a main body 2402 shaped in a cylindrical wall which holds the front lens group 1402 and three protrusions 2404 formed on an outer circumferential surface of the main body 2402 at an interval of 120°.

The movable ring 26 is formed in a cylindrical wall a size larger than the holder 24, and it has in its outer circumferential surface 2602 three cam grooves 2604 extending in the circumferential direction.

The main part 28 of the cylindrical body 1406 of the lens barrel 10 comprises a cylindrical wall 2802 accommodating and holding the rear lens group 1404, and an attaching portion 2806 of a rectangular planar shape which is joined to a rear end of the cylindrical wall 2802 and attached to the rear unit 22. The cylindrical wall 2802 has three longitudinal grooves 2804 each extending in an axial direction of the cylindrical wall 2802, which are formed at an interval of 120° in the circumferential direction of the cylindrical wall 2802.

The front unit 20 is assembled as follows.

The holder 24 is accommodated in the cylindrical wall 2802, and the movable ring 26 is rotatably attached on an outer surface of the cylindrical wall 2802. The three protrusions 2404 of the holder 24 are inserted respectively in the longitudinal grooves 2804 of the cylindrical wall 2802 as well as the three cam grooves 2604 extending in the circumferential direction of the movable ring 26.

In the outer circumferential surface of the cylindrical wall 2802 of the main part 28 of the cylindrical body 1406, there are formed three grooves (not shown) extending in the circumferential direction of the wall 2802, with which three protrusions (not shown) formed in an inner circumferential surface of the movable ring 26 are respectively engaged. In this way, the movable ring 26 is attached to the main part 28 of the cylindrical body 1406 such that the movable ring 26 is not disengageable from the main part 28 of the cylindrical body 1406 and is rotatable with respect to the main part 28 of the cylindrical body 1406.

The spring washer 30 is fitted on the cylindrical wall 2802 to be interposed between a front surface of the attaching portion 2806 and a rear end of the movable ring 26 and biases the movable ring 26 in the direction to hold the protrusions in engagement with the corresponding grooves, thereby applying suitable resistance when the movable ring 26 is rotated with respect to the main part 28.

When the movable ring 26 is rotated, the three protrusions 2404 of the holder 24 are guided by the three cam grooves 2604 and the longitudinal grooves 2804, so that the holder 24 is moved in a direction parallel to the optical axis of the optical system 14 comprising the front and rear lens groups 1402, 1404. By this movement of the holder 24, the distance between the front and rear lens groups 1402, 1404 is changed, switching the focal distance of the optical system 14, namely, switching between a first focal distance for shooting a normal image and a second focal distance for shooting a macro image.

In addition to the LC light control element 16 and the imaging element 18, the rear unit 22 comprises a conductive member 32, a holding member 34, and a substrate plate 36.

The LC light control element 16 has a generally rectangular planar shape, and comprises, as shown in FIG. 3, a pair of transparent substrates 1606 disposed parallel to each other with spacing therebetween in the direction along the optical axis of the optical system 14, a pair of transparent electrodes 1608 which are formed on opposing surfaces of the transparent substrates 1606, respectively, a pair of alignment layers 1610 which are formed on opposing surfaces of the transparent electrodes 1608, respectively, and a liquid crystal layer 1604 sealed in between the alignment layers 1610 and containing liquid crystal molecules 1602 each rod-like shaped.

The LC light control element 16 is constituted by a guest-host cell where the liquid crystal layer 1604 contains a host material and a guest material. The host material is constituted by the liquid crystal molecules 1602, while the guest material is constituted by molecules of a dichroic dye.

Figure 4:
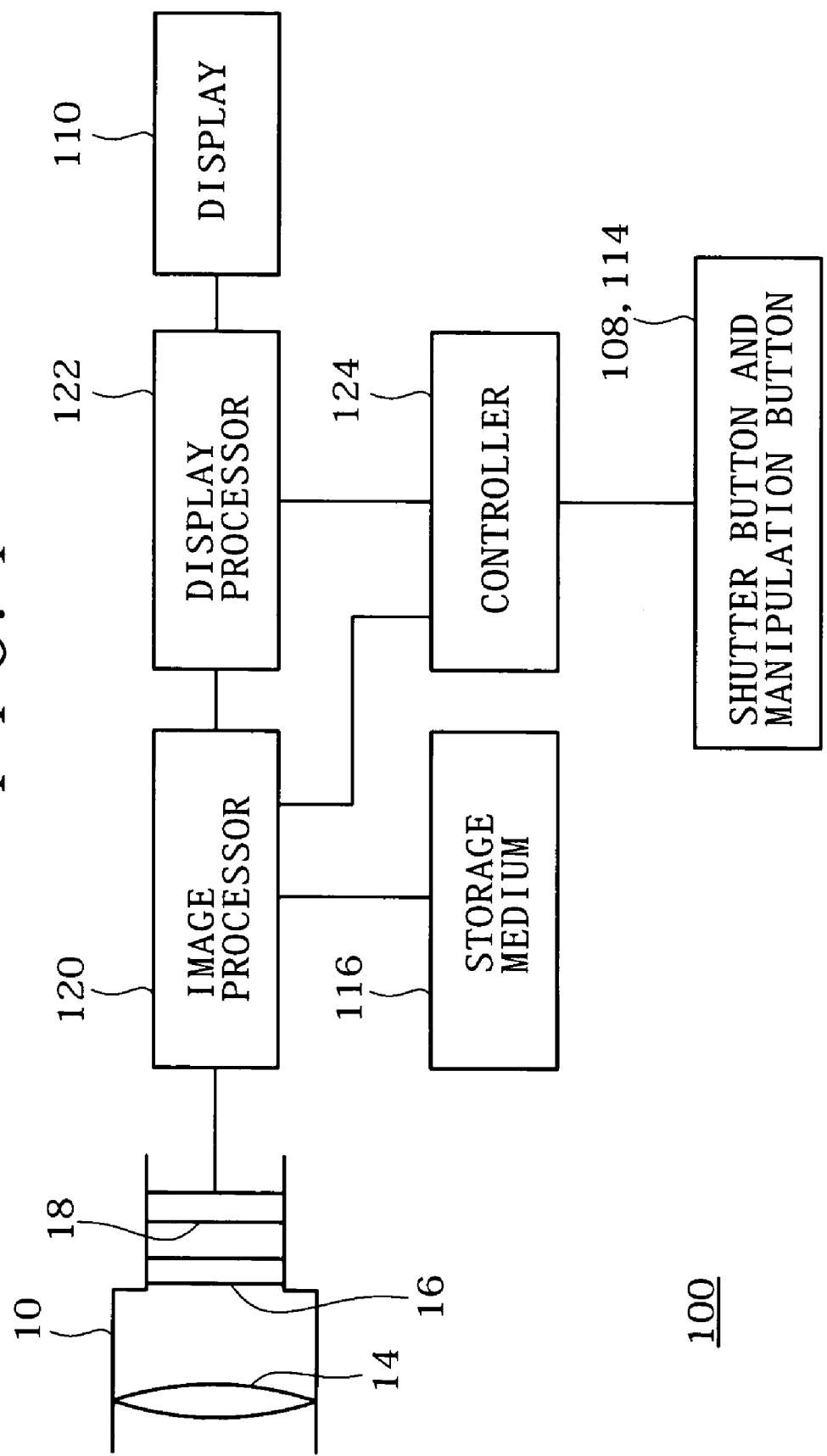
FIG. 4 is a block diagram showing a control system of the imaging device.

Although, in the present embodiment, the LC light control element 16 actually is a two-layered structure consisting of two of the LC light control elements 16 as described herein, only one of them is shown in FIG. 4, and the LC light control element 16 may be denoted as a single member 16 in some places in the following description, for the sake of simplification of the illustration.

Figure 9:
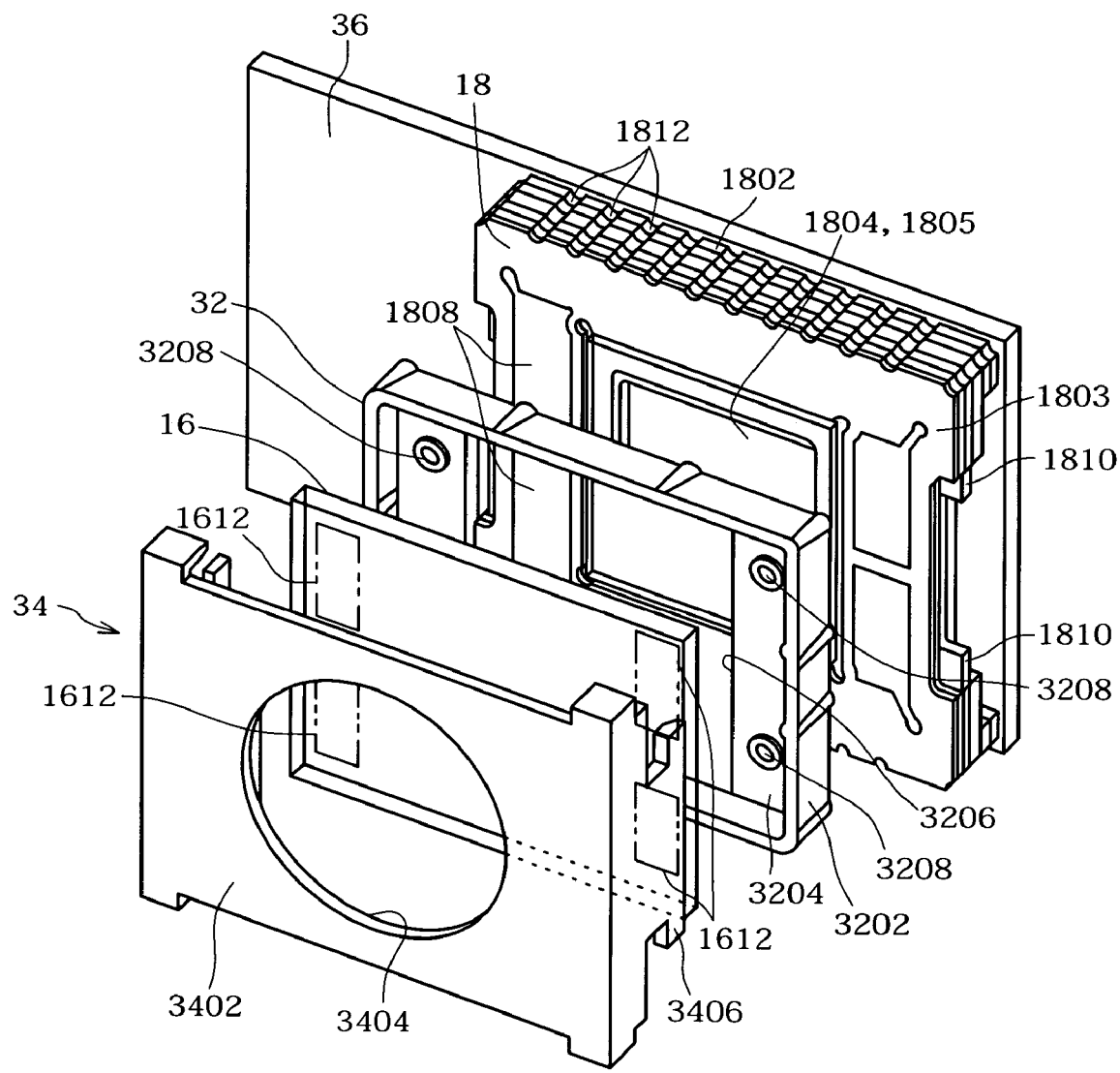
FIG. 9 is an exploded perspective view of the rear unit.

As shown in FIG. 9, in a back surface of the rear one of the two transparent substrates 1606, that is, the one transparent substrate 1606 located on the side remote from the optical system 14, there are disposed a total of four actuation electrodes 1612. Two of the four actuation electrodes 1612 are disposed in the vicinity of one of the shorter sides of the transparent substrate 1606, with spacing in the direction of the shorter side, and the other two actuation electrodes 1612 are disposed in the vicinity of the other shorter side with spacing in the same direction. Among the four actuation electrodes 1612, two of them are connected to the transparent electrodes 1608 of one of the two LC light control elements 16, while the other two are connected to the transparent electrodes 1608 of the other LC light control element 16.

As shown in FIG. 9, the conductive member 32 comprises four side walls 3202 formed so as to encircle four edges of the LC light control element 16 and two band-like shaped segments 3204 of a rear wall joined to rear ends of the side walls 3202 to face the actuation electrodes 1612 of the LC light control element 16, with a rectangular opening between the rear wall segments 3204.

A plurality of ribs 3210 are formed in inner surfaces of the four side walls 3202 and held in contact with the four edges of the LC light control element 16 to thereby position the LC light control element 16 relatively to the conductive member 32.

Figure 11:
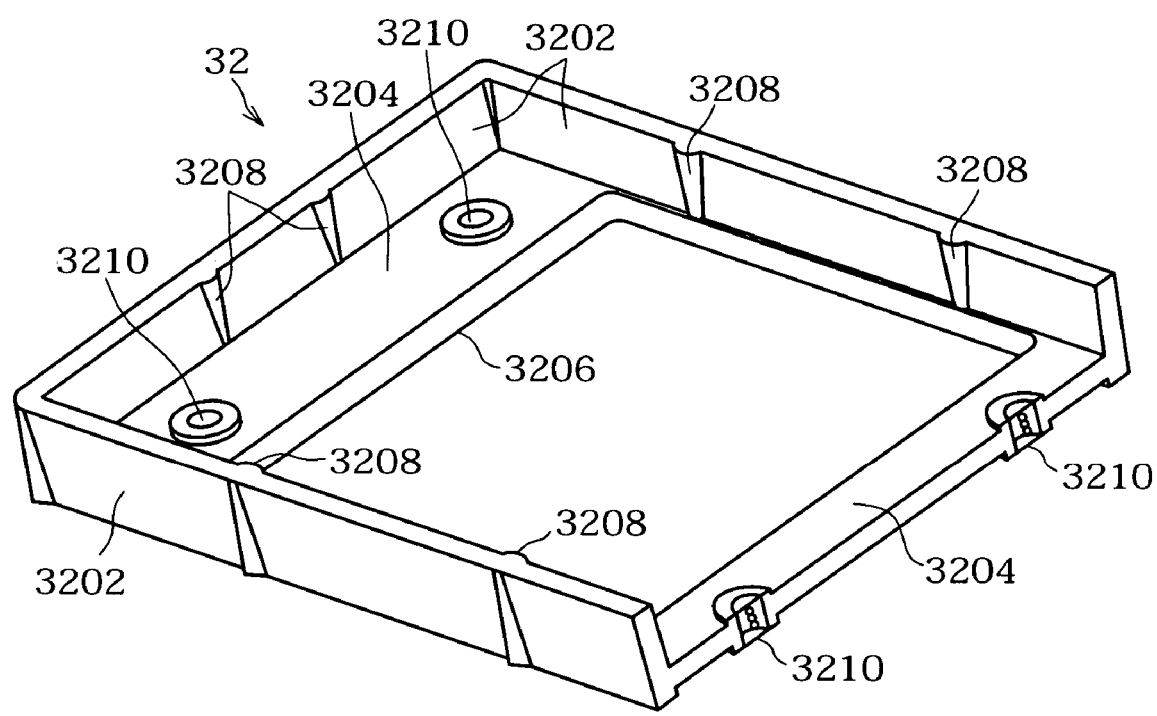
FIG. 11 is a perspective view of a conductive member included in the rear unit.

As shown in FIG. 11 with a part cut away, the conductive member 32 has four conductive portions 3208 formed by perforating the rear wall segments 3204 at positions respectively corresponding to the actuation electrodes 1612. Each conductive portion 3208 is of the kind that has been conventionally used for the connection of electrodes of a liquid crystal element, i.e., the so-called dot connector or zebra rubber, which is formed by dispersing a pulverized material having an electrical conductivity in an insulating material such as a rubber.

The side walls 3202 and rear wall segments 3204 are formed of an insulating material having a tackiness, such as a rubber. The rear wall segments 3204 may be formed of a material having a property that the rear wall segments 3204 exhibit an electrical conductivity in the direction of its thickness but exhibiting a high resistance in the direction perpendicular to the thickness direction.

As shown in FIGS. 9 and 10, the holding member 34 comprises a planar part 3402 of a rectangular shape a size larger than the dimensions of the conductive member 32 and an opening 3404 formed at the center of the planar part 3402.

A pair of engaging parts 3406 are provided to protrude rearward from the respective shorter sides of the planar part 3402, and a pair of protrusions 3408 each elongated in a direction along the shorter sides are formed in the vicinity of the respective shorter sides.

Figure 12:
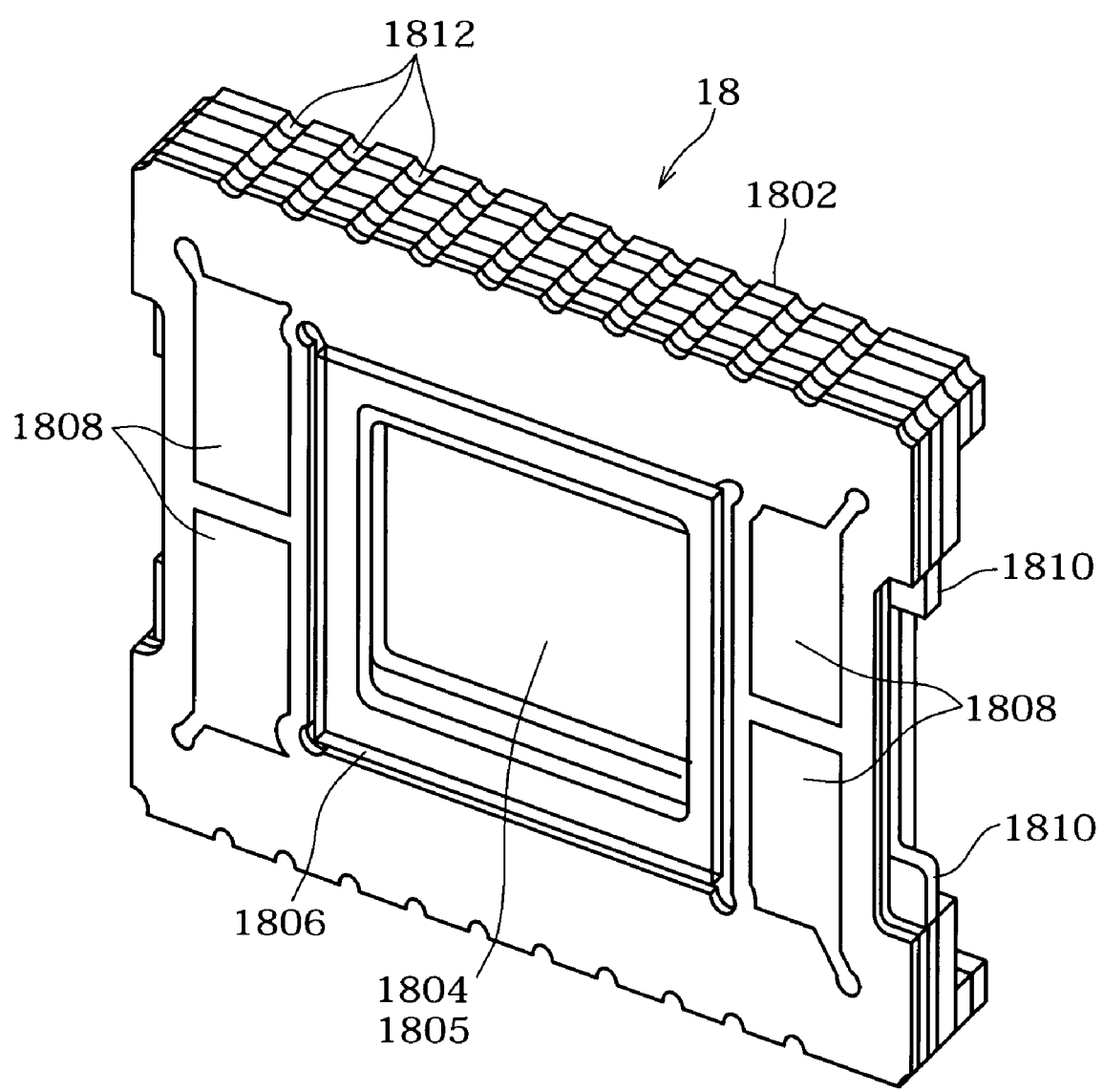
FIG. 12 is a perspective view of the imaging element.

As shown in FIGS. 6, 9 and 12, the imaging element 18 comprises a package 1802 having a rectangular planar shape, a sensor unit 1804 accommodated in a rectangular recess formed at the center of the front face of the package 1802, and a cover glass 1806 attached to the front face of the package 1802 to seal the sensor unit 1804 in the rectangular recess.

Figure 8:
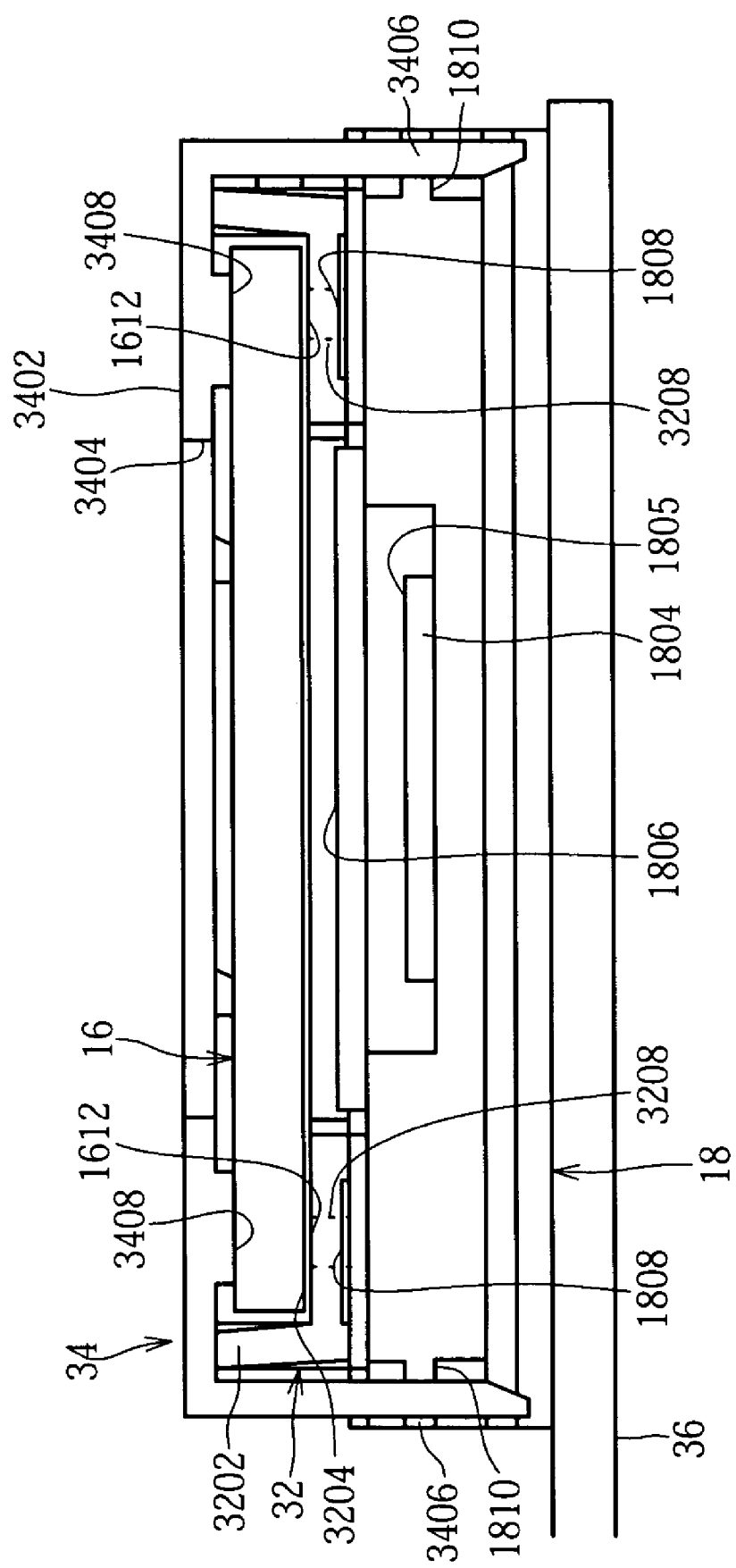
FIG. 8 is a cross-sectional view of the assembly shown in FIG. 7.

The sensor unit 1804 is constituted by a rectangular plate-like chip of a CCD image sensor, for instance, and its front surface is formed as a rectangular imaging area 1805, as shown in FIG. 8. In this embodiment, the longer and shorter sides of the imaging area are respectively parallel to the longer and shorter sides of the package 1802.

In the edges of the two shorter sides of the package 1802, there are formed engaged parts 1810 with which the engaging parts 3406 of the holding member 34 engage, respectively.

In a front face of the package 1802, two electrodes 1808 are disposed in the vicinity of each of the two shorter sides thereof, and, accordingly, a total of four electrodes 1808 are disposed in the front face.

A plurality of terminals 1812 for inputting and outputting of electric signals, including an image signal into and from the sensor unit 1804 are provided in edges of the two longer sides of the package 1802. Among all the terminals 1812, four of them are electrically connected to the four electrodes 1808 inside the package 1802.

The substrate plate 36 is a rectangular planar member a size larger than the imaging element 18. A front surface of the substrate plate 36 is attached to a rear surface of the imaging element 18 by being bonded thereto with an adhesive, for instance. The terminals 1812 of the imaging element 18 are connected to respective terminals (not shown) disposed in the front surface of the substrate plate 36 by soldering.

In a rear surface of the substrate plate 36, there are disposed a circuit which inputs and outputs electric signals, including the image signal to and from the sensor unit 1804, and processes the image signal, and a circuit for applying a drive voltage to the LC light control element 16.

The rear unit 22 is assembled as follows.

The conductive member 32 is set on the front side of the imaging element 18 that has been soldered to the substrate plate 36. The LC light control element 16 is accommodated inside the four side walls 3202 of the conductive member 32 thus set. The holding member 34 is set to cover the light control element 16, with the engaging parts 3406 respectively engaged with the engaged parts 1810.

With the holding member 34 thus engaged with the imaging element 18, the LC light control element 16 and the conductive member 32 are held by and between the planar part 3402 of the holding member 34 and a front surface of the imaging element 18, and thereby a rear surface of each conductive portion 3208 of the conductive member 32 is held in pressing contact with a corresponding one of the electrodes 1808 of the package 1802, while the front surface of each conductive portion 3208 of the conductive member 32 is held in pressing contact with a corresponding one of the actuation electrodes 1612 of the LC light control element 16.

As shown in FIG. 8, since the protrusions 3408 of the holding member 34 press respectively corresponding portions on the actuation electrodes 1612 of the LC light control element 16, pressing contact between the conductive portions 3208 and the actuation electrodes 1612 of the LC light control element 16 and pressing contact between the conductive portions 3208 and the electrodes 1808 of the package 1802 are ensured, with enhanced reliability.

Hence, the drive voltage generated at the substrate plate 36 is applied to the transparent electrodes 1608 of the LC light control element 16 via the terminals 1812 of the substrate plate 36, the electrodes 1808 of the package 1802, the conductive portions 3208 of the conductive member 32, and the actuation electrodes 1612 of the LC light control element 16.

The front unit 20 is attached to the rear unit 22 by bonding the attaching portion 2806 of the main part 28 of the cylindrical body 1406 of the barrel to a front surface of the planar part 3402 of the holding member 34 with an adhesive.

There will be described an operation and effects of the embodiment.

First, an operation of the LC light control element 16 will be described in detail.

As shown in FIG. 3, in this embodiment the dimension of the optical system 14 in the direction of the optical axis of the front and rear lens groups 1402, 1404 is decreased to reduce the diameter and length of the cylindrical body 1406 to accomplish a reduction in size of the optical system 14. Therefore, in terms of optical design, the light rays guided from the optical system 14 to the imaging element 18 diverge away from the optical axis as they travel toward the imaging element 18.

Figure 13:
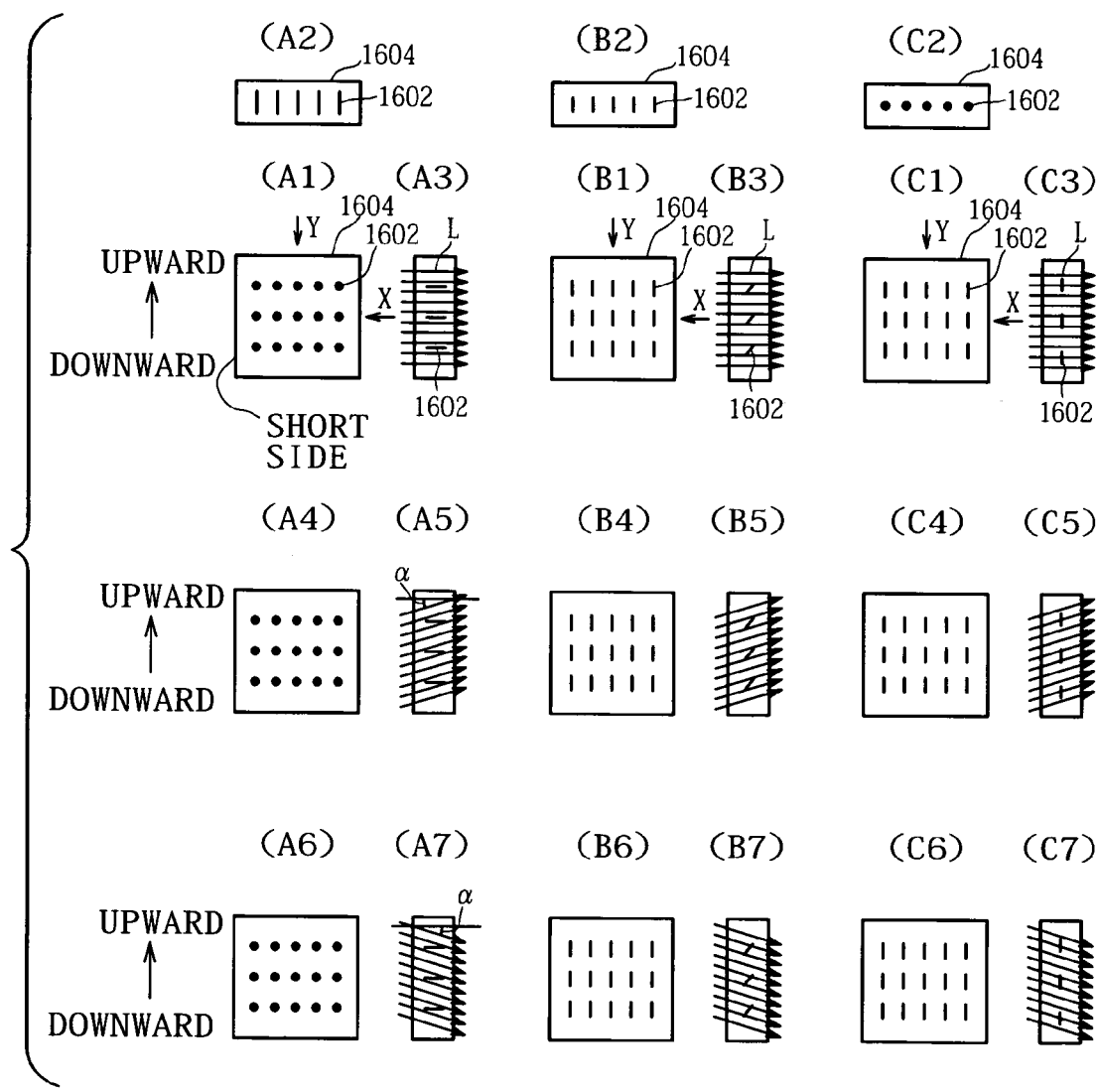
FIGS. 13(A1)-(A7), 13(B11)-(B7), and 13(C1)-(C7) are views illustrating an operation of the liquid-crystal light control element.
Figure 14:
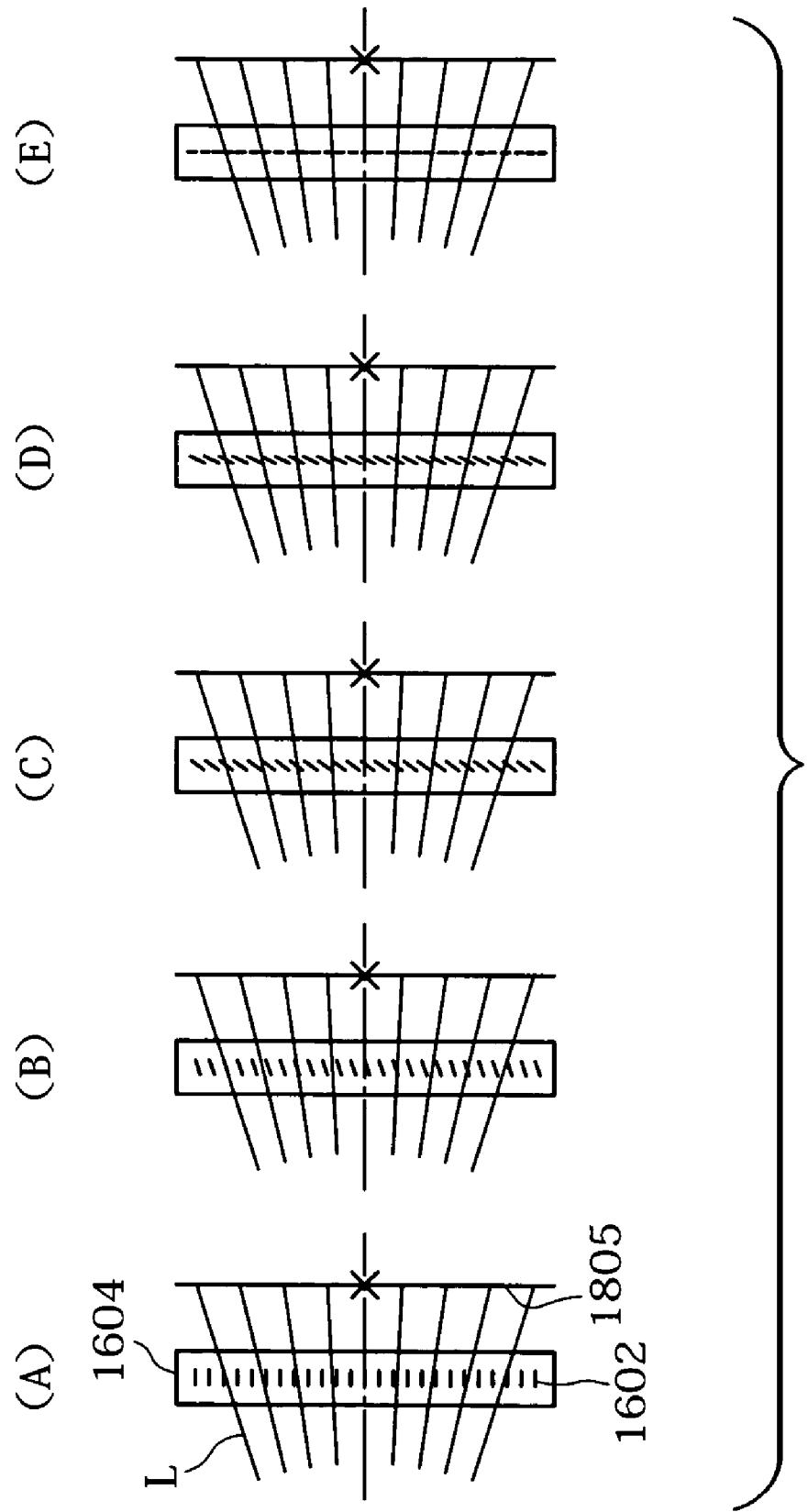
FIGS. 14(A)-14(E) are views for illustrating how an amount of light passing through the liquid-crystal light control element varies.

FIG. 13 illustrates a relationship between a tilt angle of the axes of the liquid crystal molecules 1602 contained in the liquid crystal layer 1604 and light L passing through the LC light control element 16.

As described below, the relationship between the tilt angle of the liquid crystal molecules 1602 and the light L passing through the LC light control element 16 is analogous to that between louver boards of a lightproof louver or a blind and light passing between the louver boards.

FIG. 13(A1) is a view of the LC light control element 16 as seen from its front side, while FIG. 13(A2) is the LC light control element 16 as seen in a direction along a Y-axis in which the liquid crystal molecules 1602 are oriented, and FIG. 13(A3) is that as seen in a direction along an X-axis which is perpendicular to the Y-axis direction or the orientational direction. FIGS. 13(A1), 13(A2), and 13(A3) show a state of the LC light control element 16 where a drive voltage is not applied thereto. As shown in these figures, in this embodiment, the orientational direction of the LC light control element 16 is substantially parallel to the shorter sides of the imaging area 1805 of the imaging element 18.

Accordingly, the tilt angle of the axes of the liquid crystal molecules 1602 with respect to the direction of the thickness of the liquid crystal layer 1604 is 0°. Therefore, when light L whose traveling direction is parallel to the thickness direction of the liquid crystal layer 1604 is incident on the LC light control element 16, the amount of light passing through the LC light control element 16 takes the maximum value, correspondingly to the tilt angle made between the light L and axes of the liquid crystal molecules 1602, which is 0°.

FIGS. 13(B1), 13(B2), and 13(B3) are views of the LC light control element 16 respectively corresponding to FIGS. 13(A1), 13(A2), and 13(A3), but they show a state where a drive voltage is applied to the LC light control element 16.

In this state, the tilt angle of the axes of the liquid crystal molecules 1602 with respect to the thickness direction of the liquid crystal layer 1604 is 45°, for instance. Therefore, when light L whose traveling direction is parallel to the thickness direction of the liquid crystal layer 1604 is incident on the LC light control element 16, the amount of light passing through the LC light control element 16 takes an intermediate value, correspondingly to the tilt angle made between the light L and axes of the liquid crystal molecules 1602, which is 45°.

FIGS. 13(C1), 13(C2), and 13(C3) are views of the LC light control element 16 respectively corresponding to FIGS. 13(A1), 13(A2), and 13(A3), but they show a state where a drive voltage at the maximum value is applied to the LC light control element 16.

In this state, the tilt angle of the axes of the liquid crystal molecules 1602 with respect to the thickness direction of the liquid crystal layer 1604 is 90°. Therefore, when light L whose traveling direction is parallel to the thickness direction of the liquid crystal layer 1604 is incident on the LC light control element 16, the amount of light passing through the LC light control element 16 takes the minimum value, corresponding to the tilt angle made between the light L and axes of the liquid crystal molecules 1602, which is 90°.

There will be described cases where the traveling direction of the light L is inclined with respect to the thickness direction of the liquid crystal layer 1604, with the tilt angle of the axes of the liquid crystal molecules 1602 being 0°, 45°, and 90°, respectively, with respect to the thickness direction of the liquid crystal layer 1604.

In the description below, the opposite sides of the LC light control element 16 in the direction of the Y-axis along which the liquid crystal molecules 1602 are oriented are referred to as the upper and lower sides, respectively, as shown in FIGS. 13(A1)-13(C7), for convenience of explanation.

A case where the traveling direction of the light L is inclined upwardly at an angle α with respect to the thickness direction of the liquid crystal layer 1604 is shown in FIGS. 13(A4), 13(A5), 13(B4), 13(B5), 13(C4) and 13(C5). As to the tilt angle of the axes of the liquid crystal molecules 1602, it is the same in FIGS. 13(A4) and 13(A5) as in FIGS. 13(A1) and 13(A3), and the same in FIGS. 13(B4) and 13(B5) as in FIGS. 13(B1) and 13(B3), and the same in FIGS. 13(C4) and 13(C5) as in FIGS. 13(C1) and 13(C3).

On the other hand, a case where the traveling direction of the light L is inclined downwardly at an angle α with respect to the thickness direction of the liquid crystal layer 1604 is shown in FIGS. 13(A6), 13(A7), 13(B6), 13(B7), 13(C6) and 13(C7) As to the tilt angle of the axes of the liquid crystal molecules 1602, it is the same in FIGS. 13(A6) and 13(A7) as in FIGS. 13(A1) and 13(A3), the same in FIGS. 13(B6) and 13(B7) as in FIGS. 13(B1) and 13(B3), and the same in FIGS. 13(C6) and 13(C7) as in FIGS. 13(C1) and 13(C3).

It can be seen from these figures that even while the tilt angle of the axes of the liquid crystal molecules 1602 with respect to the thickness direction of the liquid crystal layer 1604 is the same, a change in the angle of the traveling direction of the light L with respect to the thickness direction of the liquid crystal layer 1604 changes the tilt angle of the axes of the liquid crystal molecules 1602 with respect to the traveling direction of the light L.

As described above, the light rays emitted from the optical system 14 diverge away from the optical axis as they travel toward the imaging element 18. Hence, the angle of the traveling direction of the light L with respect to the thickness direction of the liquid crystal layer 1604 varies depending on the location on the LC light control element 16, and accordingly the amount of light passing through the LC light control element 16 varies depending on the location.

This point will be described in more detail.

FIGS. 14(A)-14(E) are views where the tilt angle of the axes of the liquid crystal molecules 1602 with respect to the thickness direction of the liquid crystal layer 1604 gradually increases from 0° to 90°.

Figure 15:
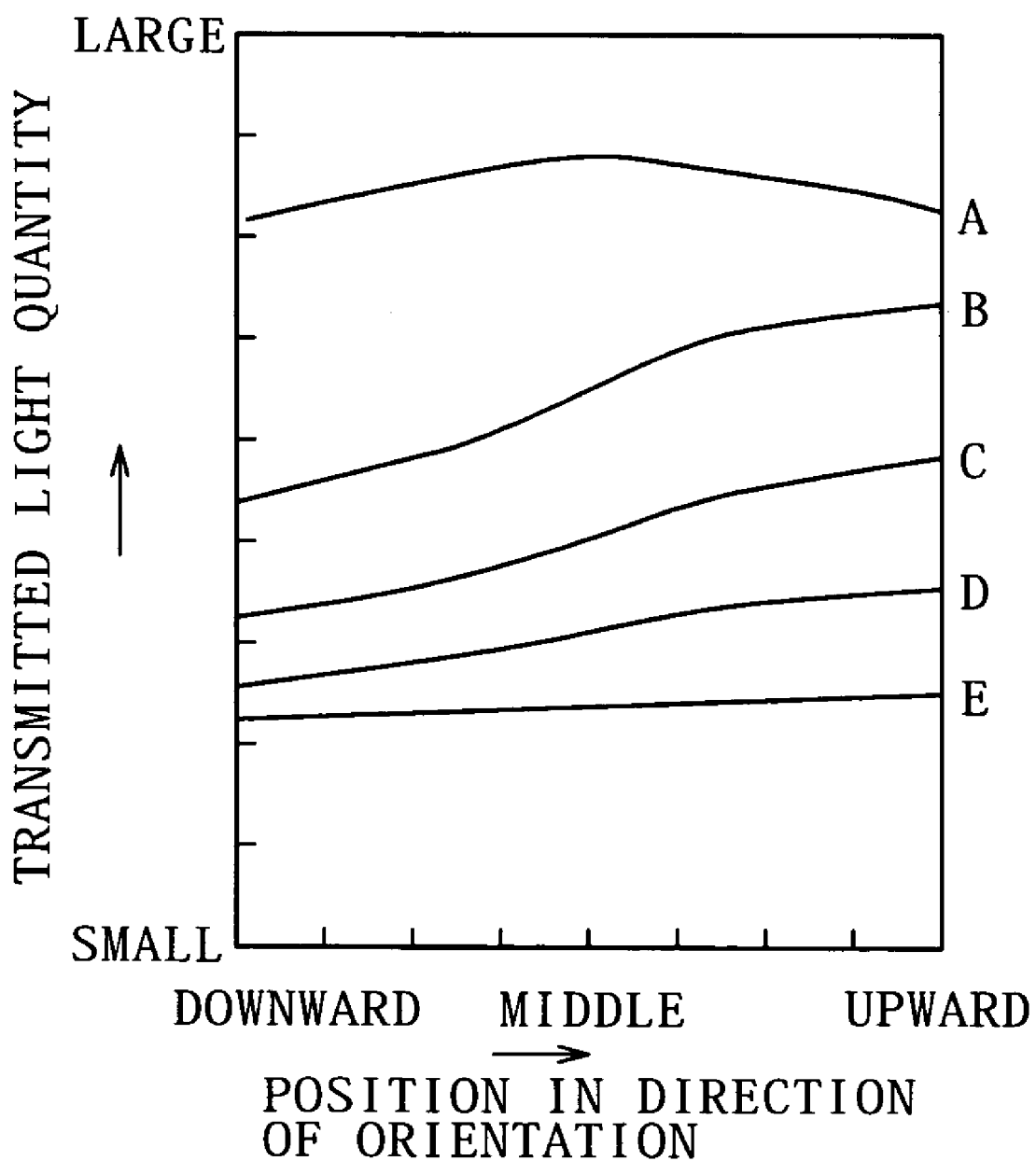
FIG. 15 is a characteristic chart related to the amount of light illustrated in FIGS. 14(A)-14(E)

In the chart of FIG. 15, the horizontal axis indicates the position in the orientational direction or the Y-axis direction on the LC light control element 16, while the vertical axis indicates the amount of light L passing through the LC light control element 16. Reference numerals A-E correspond to FIGS. 14(A)-14 (E), respectively.

As indicated by A-E in FIG. 15, the amount of light passing through the LC light control element 16 varies depending on the location in the orientational direction of the LC light control element 16 or Y-direction.

Particularly as indicated by B-E in FIG. 15, where the tilt angle of the liquid crystal molecules 1602 is other than 0°, the amount of light passing through the LC light control element 16 monotonously (i.e., steplessly or continuously) varies, namely, increases or decreases, depending on the location in the orientational direction or Y-axis direction.

There will be discussed a case where the inclination of the axes of the liquid crystal molecules 1602 of the LC light control element 16 is as shown in FIGS. 14(B)-14(E), and an image of an object radiating light rays of uniform intensity is taken and therefore light of a uniform brightness is incident on the LC light control element 16 from the optical system 14.

Figure 16A:
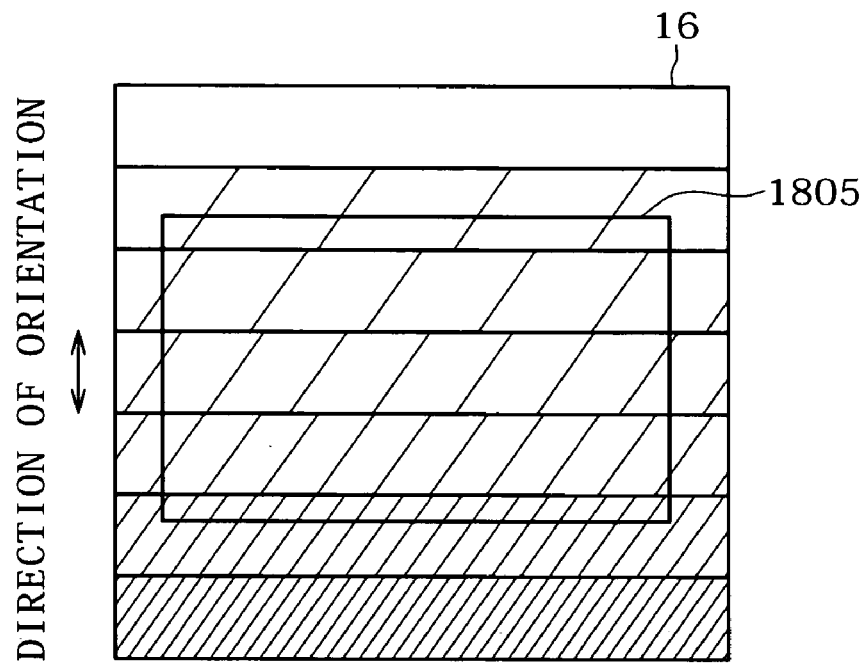
FIGS. 16(A) and 16(B) are views for illustrating a relationship between the amount of light passing through the liquid-crystal light control element and the position in an imaging area.
Figure 16B:
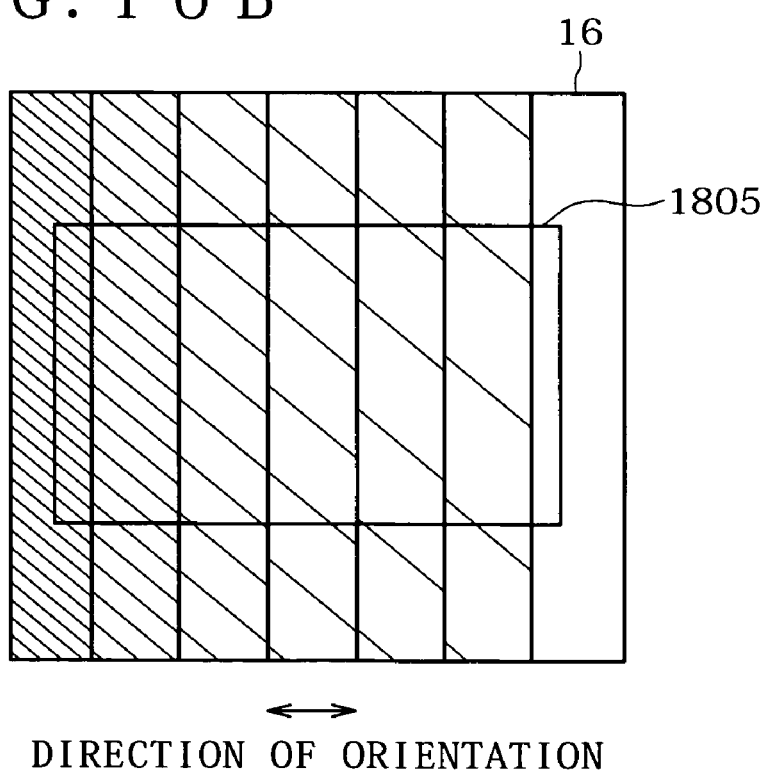

FIGS. 16(A) and 16(B) show a positional relationship between the imaging area 1805 and the LC light control element 16. FIG. 16(A) shows an arrangement where the orientational direction of the LC light control element 16 is parallel to the shorter sides of the imaging area 1805, while FIG. 16(B) shows an arrangement where the orientational direction of the LC light control element 16 is parallel to the longer sides of the imaging area 1805.

In FIG. 16, the density of the hatching represents the amount of the light passing through the LC light control element 16. Namely, the thinner the hatching, the more light is passing, and the denser the hatching, the less light is passing. In FIG. 16, boundary lines are drawn between different densities of the hatching for convenience of explanation, but boundaries do not exist in the actual amount of passing light.

In either of FIGS. 16(A) and 16(B), the amount of passing light varies along the direction of the shorter or longer sides of the imaging area 1805. Such variation in the amount of passing light affects the brightness in the image taken by the imaging element 18, making the brightness of the image unnatural.

When comparing the arrangements shown in FIGS. 16(A) and 16(B), respectively, it can be seen that the variation in the amount of passing light in the arrangement of FIG. 16(A) where the variation occurs along the direction of the shorter sides is smaller than that in the arrangement of FIG. 16(B) where the variation occurs in the direction along the longer sides.

In the present embodiment, where the orientational direction of the LC light control element 16 is substantially parallel to the shorter sides of the imaging area 1805, even when rays of light L from the optical system 14 gradually diverge away from the optical axis as they travel toward the imaging element 18 due to the reduced size of the optical system 14, the influence of the variation in the amount of passing light on the brightness of the image is reduced compared to the arrangement where the orientational direction of the LC light control element 16 is substantially parallel to the longer sides of the imaging area 1805, because the amount of the light passing through the LC light control element 16 is less varied. Hence, when the taken image is presented on the display 110, as shown in FIG. 2, the arrangement according to this embodiment is advantageous for making the unnatural variation in brightness in the image less noticeable when the image is viewed.

More specifically described, since the shorter sides of the rectangular imaging area 1805 of the imaging element 18 and the shorter sides of the rectangular screen 111 of the display 110 correspond, the brightness variation in the image taken by the imaging element 18 and displayed on the screen 111 occurs in the direction along the shorter sides of the screen 111.

Therefore, as compared to an arrangement where the brightness variation in the image displayed on the screen 111 occurs in the direction of the longer sides of the screen 111, the brightness variation in the image displayed on the screen 111 can be reduced in the arrangement where the brightness variation occurs in the direction along the shorter sides of the screen 111.

The effect of reducing the brightness variation in the image enhances with an increase in the ratio of the dimension of the longer sides of the imaging area 1805 to the dimension of the shorter sides thereof.

Further, the arrangement which makes the unnatural variation in brightness in the taken image less noticeable when the image is viewed is advantageous for reducing the size of the optical system 14, and it is thus significantly advantageous for reducing the size of an imaging device including the lens barrel 10 and various kinds of portable electronic devices into which the lens barrel 10 is built.

It is noted that when printing out the taken image in a rectangular area, the arrangement of the embodiment is effective to make the unnatural variation in the brightness in the printed image less noticeable when viewed, similar to the case where the image is presented on the display 110.

It is known experimentally that due to the characteristics of human visual sensation, it is felt less unnatural where the brightness in an image gradually lowers downward, or from top down, than when the brightness gradually increases from top down.

Thus, where the imaging device is arranged such that the vertical or height direction of the image taken by the imaging element 18 is substantially parallel to the shorter sides of the imaging area 1805 of the imaging element 18, the orientational direction of the LC light control element 16 is preferably set such that the amount of the light passing through the LC light control element 16 monotonously (i.e., steplessly or continuously) decreases from the upper side toward the lower side of the image, so that the brightness in the image taken by the imaging element 18 monotonously decreases in the vertical direction from top down. This arrangement makes the embodiment further advantageous for making the unnatural variation in brightness in the image taken by the imaging element 18 less noticeable when it is viewed.

Second Embodiment

Figure 17:
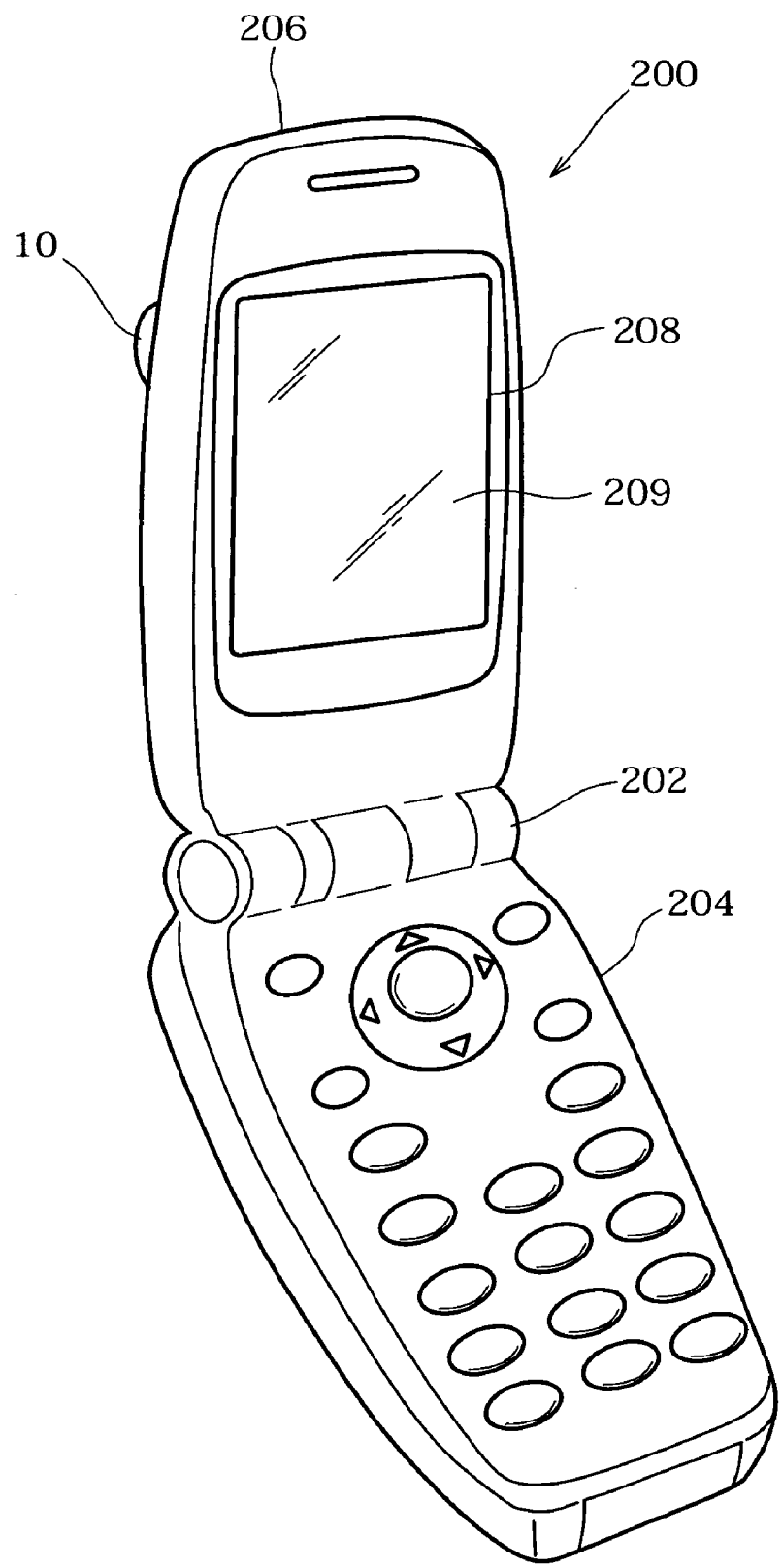
FIG. 17 is a perspective view of a mobile phone according to a second embodiment of the invention.

FIG. 17 is a perspective view of a mobile phone 200 according to a second embodiment of the invention.

The mobile phone 200 comprises a manipulation portion 204 and a display portion 206 which are connected with a hinge 202. The display portion 206 has a lens barrel 10 similar to that according to the first embodiment and exposed to the external space. In an inner surface of the display portion 206, a display 208 similar to the display 110 of the first embodiment is disposed.

The mobile phone 200 has functions including one for taking an image through the lens barrel 10 in a way similar to the imaging device 100 of the first embodiment and displaying the image on the display 208, and it constitutes an imaging device according to the present invention.

Although the mobile phone 200 is different from the imaging device 100 of the first embodiment in that the direction of the shorter sides of a screen 209 of the display 208 as used in an ordinary fashion coincides with the horizontal direction and the longer sides thereof coincides with the vertical direction, the principle of the invention also is applicable to the mobile phone 200. Namely, by having an orientational direction of a LC light control element 16 of the lens barrel 10 substantially parallel to the shorter sides of the imaging area 1805, an unnatural variation in brightness in a taken image can be made less noticeable when it is viewed.

In this case, although the brightness variation in the image presented on the display 208 occurs in the direction along the shorter sides of the screen 209 of the display 208 (i.e., horizontal direction), the same effect that the unnatural variation in brightness in the image can be made less noticeable when viewed is obtained.

In the second embodiment, it may be arranged such that the orientational direction of the LC light control element 16 of the lens barrel 10 is purposely set to be substantially perpendicular to the shorter sides of the imaging area 1805, as well as to have the amount of the light passing through the light control element 16 monotonously decreases in a direction from one of the vertically opposite sides of the taken image toward the other of the vertically opposite sides. In this arrangement, the variation in the amount of the passing light along the vertical direction of the taken image is utilized for making the unnatural variation in brightness in the taken image along the vertical direction less noticeable when the image is viewed.

Although, for illustrative purposes only, there have been described a digital still camera and a mobile phone as imaging devices according to the embodiments of the invention, the present invention is applicable to other imaging devices, such as a video camera and a television camera, as well as to various electronic devices having a lens barrel.

What is claimed is:

1. A lens barrel comprising:
    an optical system having an optical axis and guiding an image of an object;
    an imaging element which includes a rectangular imaging area having longer sides and shorter sides, and is disposed in the optical axis of the optical system; and
    a liquid-crystal light control element which is disposed in the optical axis between the optical system and the imaging element, and comprises:

a pair of transparent electrodes which are disposed in parallel to each other with spacing therebetween in a direction along the optical axis;

a pair of alignment layers formed on respective opposing surfaces of the transparent electrodes; and a liquid crystal layer which is sealed in between the alignment layers and contains liquid crystal molecules each rod-like shaped, the liquid-crystal light control element adjusting an amount of light passing therethrough by changing a tilt angle of axes of the liquid crystal molecules with respect to a direction of the thickness of the liquid crystal layer, by application of a voltage to the transparent electrodes, with the axes of the respective liquid crystal molecules parallel to an orientational direction which is determined by the alignment layers, said optical system including an optical lens structure being of such size within said lens barrel to cause an ever increasing diverging light ray pattern relative to said optical axis at said imaging element, wherein the orientational direction is substantially parallel to the shorter sides of the imaging area, and light rays guided from the optical system to the imaging element diverge away from the optical axis as the light rays travel toward the imaging element; and wherein when the vertical direction of an image taken on the imaging area is substantially parallel to the shorter sides of the imaging area, the orientational direction of the liquid-crystal light control element is set to monotonously decrease the amount of light passing through the liquid-crystal light control element in a direction from one of the vertically opposite sides of the image toward the other of the opposite sides.

2. The lens barrel of claim 1, wherein the amount of light passing through the light control element varies depending on the location in the orientational direction of the light control element.

3. The lens barrel of claim 1, wherein the liquid-crystal light control element is constituted by a guest-host cell where the liquid crystal layer contains a host material and a guest material, the host material being the liquid crystal molecules while the guest material being molecules of a dichroic dye.

4. The lens barrel of claim 1, wherein for a tilt angle of the liquid crystal molecules other than 0 degrees, the amount of light passing through the light control element monotonously varies depending on the location in the orientational direction.

5. An imaging device comprising:

an optical system having an optical axis and guiding an image of an object;

an imaging element which includes a rectangular imaging area having longer sides and shorter sides, and which is disposed in the optical axis of the optical system; and a liquid-crystal light control element which is disposed in the optical axis between the optical system and the imaging element, and comprises:

a pair of transparent electrodes which are disposed in parallel to each other with spacing therebetween in a direction along the optical axis;

a pair of alignment layers formed on respective opposing surfaces of the transparent electrodes; and a liquid crystal layer which is sealed in between the alignment layers and contains liquid crystal molecules each rod-like shaped, the liquid-crystal light control element adjusting an amount of light passing therethrough by changing a tilt angle of axes of the liquid crystal molecules with respect to a direction of the thickness of the liquid crystal layer, by application of a voltage to the transparent electrodes, with the axes of the respective liquid crystal molecules parallel to an orientational direction which is determined by the alignment layers, said optical system including an optical lens structure being of such size within said lens barrel to cause an ever increasing diverging light ray pattern relative to said optical axis, wherein the orientational direction is substantially parallel to the shorter sides of the imaging area, and light rays guided from the optical system to the imaging element diverge away from the optical axis as the light rays travel toward the imaging element; and wherein when the vertical direction of an image taken on the imaging area is substantially parallel to the shorter sides of the imaging area, the orientational direction of the liquid-crystal light control element is set to monotonously decrease the amount of light passing through the liquid-crystal light control element in a direction from one of the vertically opposite sides of the image toward the other of the opposite sides.

6. The imaging device of claim 5, wherein the amount of light passing through the light control element varies depending on the location in the orientational direction of the light control element.

7. The imaging device of claim 5, wherein for a tilt angle of the liquid crystal molecules other than 0 degrees, the amount of light passing through the light control element monotonously varies depending on the location in the orientational direction.

8. The lens barrel as set forth in claim 1, wherein said lens barrel forms part of a display portion in a mobile phone.

9. The imaging device as set forth in claim 5, wherein said imaging device forms part of a display portion in a mobile phone.

10. A combination comprising:

a lens barrel having an optical system having an optical axis and guiding an image of an object along said optical axis;

an imaging element which includes a generally rectangular imaging area having longer sides and shorter sides, disposed in the optical axis of the optical system; and a liquid-crystal light control element which is disposed in the optical axis between the optical system and the imaging element, said light control element comprising:

a pair of transparent electrodes which are disposed in parallel to each other with spacing therebetween in a direction along the optical axis;

a pair of alignment layers formed on respective opposing surfaces of the transparent electrodes; and a liquid crystal layer which is sealed in between the alignment layers and contains liquid crystal molecules each rod-like shaped, the liquid-crystal light control element adjusting an amount of light passing therethrough by changing a tilt angle of axes of the liquid crystal molecules with respect to a direction of the thickness of the liquid crystal layer, by application of a voltage to the transparent electrodes, with the axes of the respective liquid crystal molecules parallel to an orientational direction which is determined by the alignment layers, said optical system including an optical lens structure being of such size within said lens barrel to cause an ever increasing diverging light ray pattern relative to said optical axis at said imaging element, wherein the orientational direction is substantially parallel to the shorter sides of the imaging area, and means for guiding light rays guided from the optical system to the imaging element to diverge away from the optical axis as the light rays travel toward the imaging element; and wherein when the vertical direction of an image taken on the imaging area is substantially parallel to the shorter sides of the imaging area, the orientational direction of the liquid-crystal light control element is set to monotonously decrease the amount of light passing through the liquid-crystal light control element in a direction from one of the vertically opposite sides of the image toward the other of the opposite sides.

11. The lens barrel of claim 10, including means for varying the amount of light passing through the light control element depending on the location in the orientational direction of the light control element.

12. The lens barrel of claim 10, wherein the liquid-crystal light control element is constituted by a guest-host cell where the liquid crystal layer contains a host material and a guest material, the host material being the liquid crystal molecules while the guest material being molecules of a dichroic dye.

13. The combination of claim 10, wherein for a tilt angle of the liquid crystal molecules other than 0 degrees, said varying means varies the amount of light passing through the light control element monotonously depending on the location in the orientational direction.

14. The combination as set forth in claim 10, wherein said lens barrel forms part of a display portion in a mobile phone.

15. The combination as set forth in claim 10, wherein said imaging device forms part of a display portion in a mobile phone.

* * * * *